(12) United States Patent
Fundone

(10) Patent No.: US 8,584,834 B2
(45) Date of Patent: Nov. 19, 2013

(54) SUPPORT SYSTEM FOR GOODS CONVEYOR BELTS

(75) Inventor: Luigi Fundone, Rivoli Cascine Vica (IT)

(73) Assignee: NC Componenti S.p.A., Rivoli Cascine Vica (TO) (IT)

( * ) Notice: Subject to any disclaimer, the term of this patent is extended or adjusted under 35 U.S.C. 154(b) by 340 days.

(21) Appl. No.: 12/977,895

(22) Filed: Dec. 23, 2010

(65) Prior Publication Data

US 2011/0155543 A1    Jun. 30, 2011

(30) Foreign Application Priority Data

Dec. 23, 2009   (IT) .............................. TO2009A1031

(51) Int. Cl.
*B65G 21/10*        (2006.01)
(52) U.S. Cl.
USPC ...................................... 198/861.2

(58) Field of Classification Search
USPC ............................................. 198/861.1, 861.2
See application file for complete search history.

(56) References Cited

U.S. PATENT DOCUMENTS

| | | | | |
|---|---|---|---|---|
| 2,512,610 | A * | 6/1950 | Cartlidge | 198/861.2 |
| 3,920,115 | A * | 11/1975 | Craggs | 198/822 |
| 4,144,965 | A * | 3/1979 | Alldredge et al. | 198/838 |
| 5,033,605 | A * | 7/1991 | Marquart | 198/300 |
| 6,401,907 | B1 * | 6/2002 | Rees | 198/457.06 |
| 7,438,180 | B1 * | 10/2008 | Taylor et al. | 198/861.2 |
| 7,530,452 | B2 * | 5/2009 | Vestergaard | 198/831 |
| 2006/0096839 | A1 * | 5/2006 | Perazzo et al. | 198/757 |
| 2006/0243563 | A1 * | 11/2006 | Marti Sala | 198/723 |

\* cited by examiner

*Primary Examiner* — Mark A Deuble
(74) *Attorney, Agent, or Firm* — Merchant & Gould P.C.

(57) ABSTRACT

A support system (10) for goods conveyor belts includes a supporting frame and conveyor (30) fixed to the supporting frame and designed for defining a curved path upon which goods are handled. The support system (10) has a plurality of connection brackets (23) among the supporting frame and the conveyor (30).

8 Claims, 3 Drawing Sheets

SUPPORT SYSTEM FOR GOODS CONVEYOR BELTS

This application claims benefit of Serial No. TO 2009 A 001031, filed 23 Dec. 2009 in Italy and which application is incorporated herein by reference. To the extent appropriate, a claim of priority is made to the above disclosed application.

BACKGROUND OF THE INVENTION

The present invention relates to the field of devices for conveying goods of small size and in particular relates to a support system for a goods conveyor belt.

It is known that goods of small size are usually conveyed on goods conveyors which include conveyor belts which are moved along fixed guides.

Furthermore, it is known that where these conveyor belts are curved, supporting frames whose size varies according to the radius of curvature are used.

As it is shown in FIG. 1, known support systems 1 have a metal frame 1 which is shaped with a peripheral portion defining a circumferential arch having radius R, to which are fixed goods conveyors 2, substantially orthogonally oriented for their height 2h with respect to the plane on which lies the metal frame 1.

Conveyor 2 is fixed to metal frame 1 by locking screws arranged around the perimeter within holes made on an external border of the frame.

The metal frame is equipped with at least passing holes 3, centered on the center of the circumferential arch having radius R, adapted to permit the positioning of a rotating shaft 4, operated for example by an electric motor, which is pivoted on one or more rotating discs 5, upon which the goods to be conveyed are positioned.

While goods conveyor 2 is positioned on an external part of the support system curve, in the internal part of the curve is positioned a protection case 6, to prevent accidents to people who accidentally contact discs 5 or other moving parts of the support system. Rotating discs 5 are then moved by lying them upon supporting and/or locking rings 7, which purpose is for example to insulate discs 5 from the non-moving parts, thus realizing a low friction.

However, support systems of the known kind have some disadvantages: in particular, depending on the radius of curvature which the goods conveyor belt has, metal frame 1 requires a size and shape to adapt to the different radii of curvature.

Therefore, a support systems manufacturer, in order to offer a range of products adapted to cover all the reasonable radii of curvature for a goods conveyor belt, has to produce metal frames 1 in multiple sizes, with considerable costs linked to the design, production and storage of them.

SUMMARY OF THE INVENTION

The purpose of the present invention is then to provide a support system for goods conveyor belts which is free from the above described problems.

BRIEF DESCRIPTION OF THE PREFERRED EMBODIMENTS

The invention will be now described with reference to the attached drawings, which illustrate a non-limiting example embodiment, wherein.

DETAILED DESCRIPTION

Figure 1:
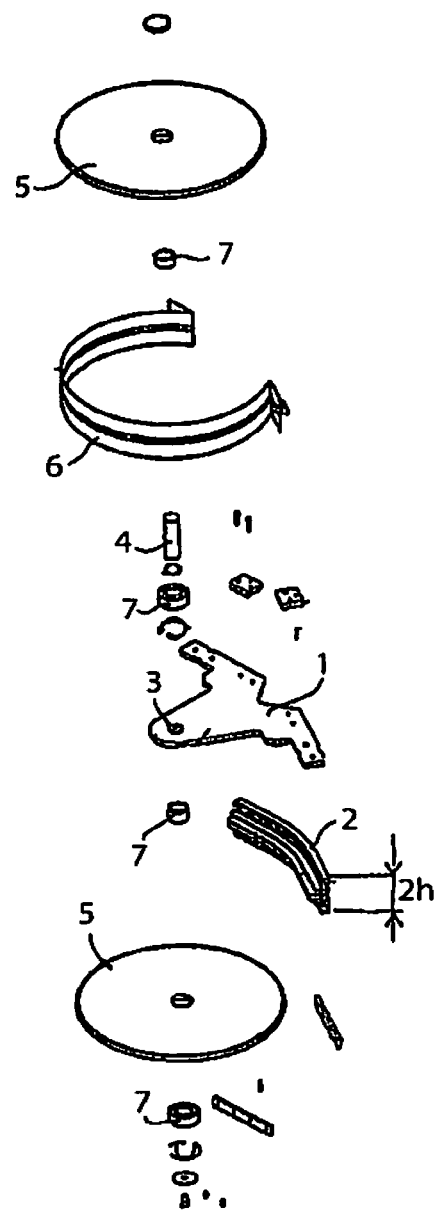
FIG. 1 shows an exploded view of a part of a prior art support system.
Figure 2:
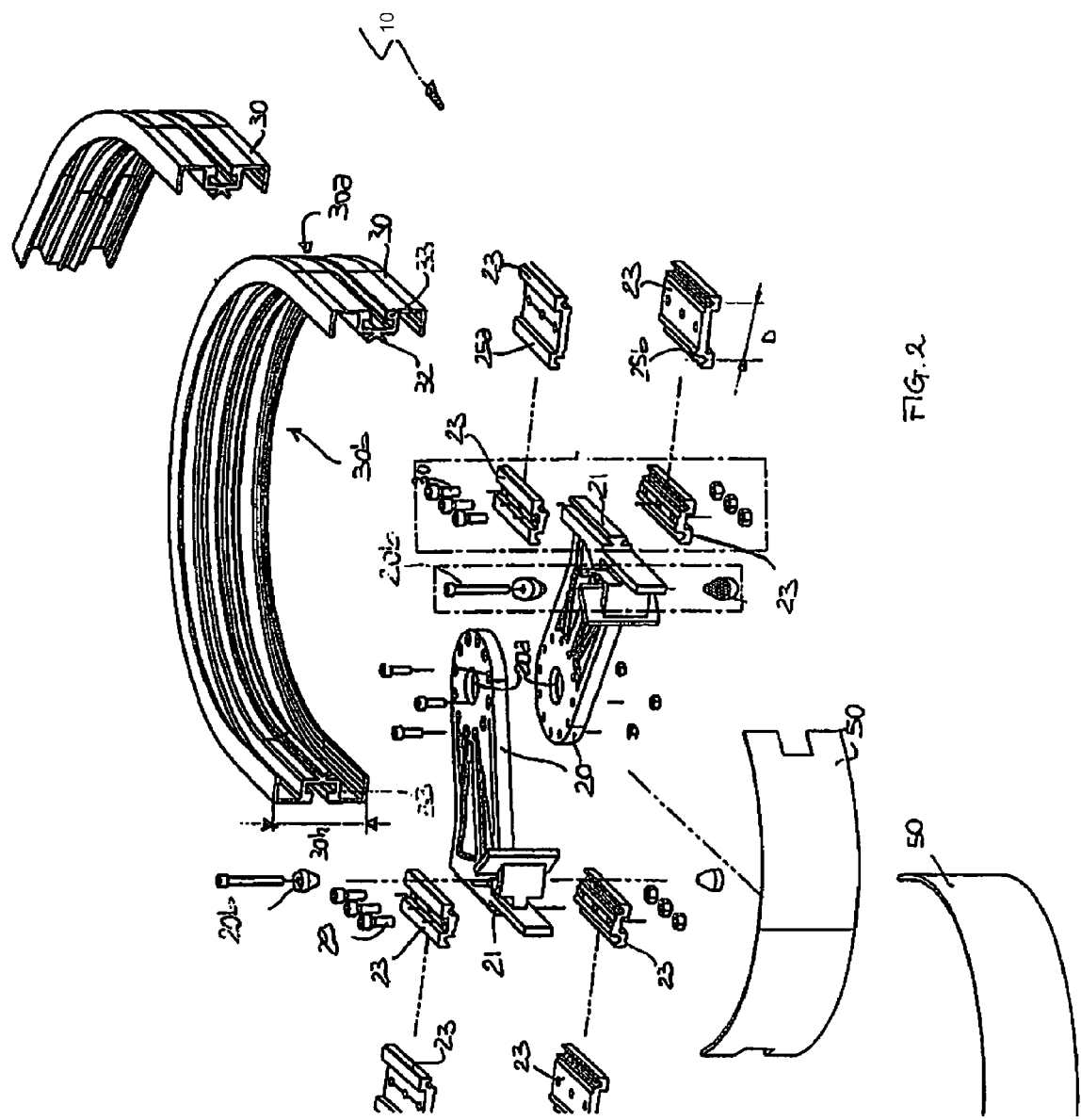
FIG. 2 shows an exploded view of a part of a support system for goods conveyor belts according to the present invention.
Figure 3:
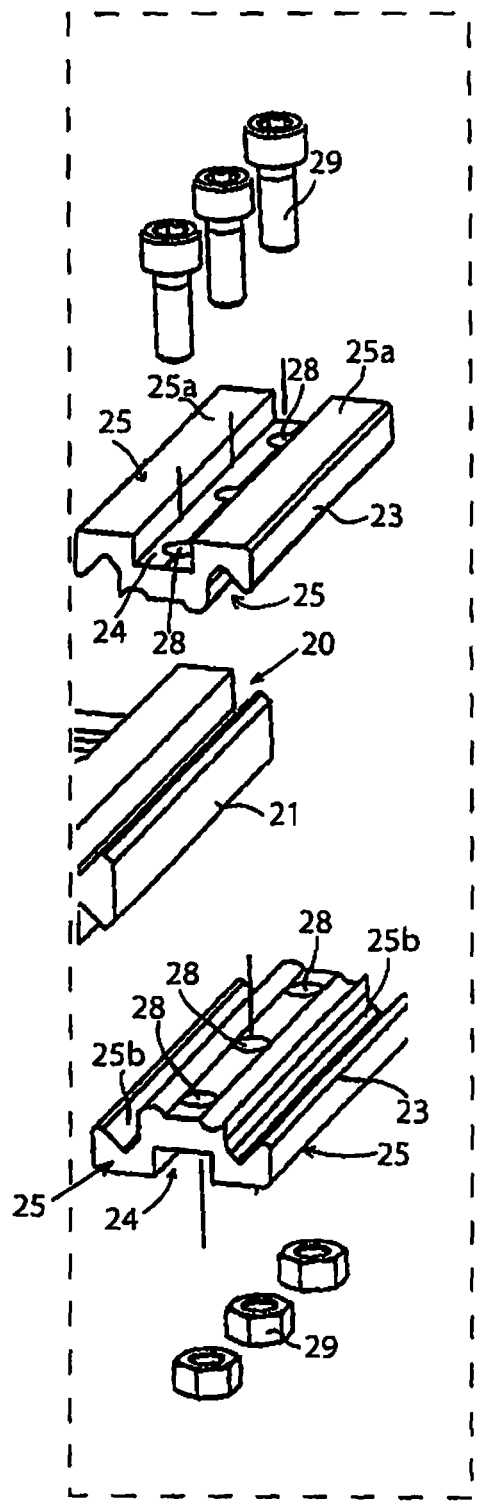
FIG. 3 shows an exploded view of a detail of part of FIG. 2.

With reference to FIG. 2, a support system for goods conveyor belts is generally indicated with 10.

Support system 10 includes metal angular elements 20 positioned on respective planes staggered and parallel between them which have a substantially planar surface (possibly equipped with reinforcement ribs) having a central hole 20a and forming a supporting frame.

A conveyor 30, in particular a conveying bended beam, is fixed to the angular elements 20 and has a curved path within which goods positioned on a rotating disc (not illustrated) are handled.

The conveyor 30 forms a curved path having the shape of circumferential arch having radius R. The circumference has a center which corresponds to a pair of central holes 20a upon angular elements 20. Upon this path are developed the translations of goods positioned on the conveying belt.

Support system 10 also includes protection carters 50, adapted to prevent a user from accidentally coming in contact with rotating parts of the system. Protection carters 50 have a first and a second ending upon which there are locking notches; these notches insert on respective vertical supporting surfaces of angular elements 20; then, through joint locks 20b they provide for pushing and locking carters 50 against these supporting surfaces.

Each of angular elements 20 is provided with a guide 21 upon one of its ends designed to connect with a plurality of brackets 23 which separate and rigidly connect the conveyor 30 with the angular elements 20. The guide 21 is a dovetail guide, oriented along a direction parallel to the plane upon which angular element 20 is positioned and substantially tangentially oriented with respect to the circumferential arch formed by the conveyor 30.

Brackets 23 include identical first and second pieces, each of which has a substantially rectangular central surface 24, to which are put side by side a pair of symmetrical and parallel lateral wings 25. The two pieces of each bracket 23 can combine together in such a way as to lock on guide 21.

The lateral wings 25 are positioned at a height staggered with respect to central surface 24 and each one has a first upper surface 25a and a second lower surface 25b. Upper surface 25a is plane whereas the lower surface 25b has a section having a profile substantially equal to half of the section of guide 21. Therefore, half of the dovetail section of guide 21 is formed on the first piece of bracket 23 and the other half is symmetrical and formed on the second piece of bracket 23.

The height difference among central surface 24 and lateral wings 25 is such that, when the two pieces of the bracket are coupled, the recess formed by surfaces 25a, 25b of lateral wings 25 has the same size and shape of the dovetail of guide 21 in a configuration that eliminates play.

Furthermore, on central surface 24 is positioned passing holes 28 adapted to permit the docking of the two pieces of bracket 23, preferably through bolts or screws 29. The passing holes 28 are aligned along a straight line.

A distance D between the two lateral wings 25 can be freely varied, thus making brackets 23 having a higher or lower width.

The conveying curved beam has a first lateral surface 30a and a second lateral surface 30b opposed between them and respectively directed towards the internal and external side of the curve created by the conveying beam; the first lateral surface is also equipped with a guide 32 having a dovetail section, designed in such a way as to permit coupling with the recess created by lateral wings 25.

The beam has guide 32 positioned on the second lateral surface 30b (i.e. the internal one) in correspondence to half of height 30h of the beam.

Upon the first lateral surface 30a, there is an external guide 33 to interface with the conveyor and locking accessories, positioned in correspondence to half of height 30h of the beam, which forms a groove embedded into lateral surface 30a and which has a rectangular section.

The advantages of the support system for goods conveyor belts are known in the light of the previous description. In particular, it is flexible to the variation of the radius of curvature which can be found in the various models produced by a manufacturer, because with a single embodiment of supporting frame 10 it is possible to create curved paths having different radii by simply varying distance D between lateral wings 25 of brackets 23.

Therefore, in this way, most of the components in the system of the present invention can be realized in a unique shape and size (obviously except from the conveyor, which the greater is the path of the curve, inevitably the longer); the only components whose size varies for adapting to different radii R of curvature are brackets 23.

Therefore, the system of the present invention achieves huge advantages from the point of view of production, cost, and containment.

Supporting frame 10 can be made in a unique manner with a single dimension, which defines a minimal radius R of curvature; all the radii of curvature of the path of the conveyor belts which are to be obtained as bigger with respect to the previous minimum radius, will be easily obtainable using brackets 23 having lateral wings 25 positioned at a distance D proportionally higher.

Furthermore, the asymmetry of lateral wings 25 of brackets 23 is such that they do not have a unique mounting direction, but respectively, they can be indistinctly installed by orienting them upon one of lateral wings 25. Therefore, another advantage of the system according to the present invention is greater mounting ease.

The device described may have obvious variants for a person skilled in the art without departing from the protective scope of the attached claims.

The invention claimed is:

1. Support system for goods conveyor belts, said system comprising:
    a supporting frame and a conveying member; said conveying member being fixed to said supporting frame and being configured to define a curved path upon which goods are handled;
    a plurality of interchangeable connection brackets connected to said supporting frame and said conveying member; said brackets presenting a width, said width being variable from bracket to bracket to vary the radius of the curved path of the conveyor member;
    said supporting frame comprising a plurality of angular elements each having a guide with a dovetail section designed for coupling with said brackets;
    each of said brackets comprising a first piece and a second piece identical to the first piece, the first piece and second piece being configured for being coupled to each other and forming a dovetail portion coupled to said guide of one of the angular elements.

2. Support system according to claim 1, wherein each of said first pieces and second pieces presents a central surface and a couple of symmetrical lateral wings; each of said lateral wings defining a section that when said first piece, and said second piece are coupled, form recesses taking up the section of said guide.

3. Support system according to claim 2, wherein said lateral wings comprise a first surface and a second surface and wherein said second surface presents a profile equal to a half section of said guide.

4. Support system according to claim 1, wherein said conveying member comprises a first surface and a second surface, and a central guide configured for coupling with said brackets on a said second surface.

5. Support system according to claim 1, wherein said curved path is a circumferential arch having a radius.

6. Support system according to claim 1, wherein each of said angular elements has a respective central hole.

7. Support system according to claim 5, wherein said central hole is made in correspondence with said circumferential arch having a radius.

8. Support system according to claim 1, further comprising protection carters having a first end and a second end coupled with joint locking means provided on said angular elements.

* * * * *